United States Patent
Yamazaki et al.

(10) Patent No.: US 6,378,901 B1
(45) Date of Patent: Apr. 30, 2002

(54) GAS GENERATOR FOR AN AIR BAG AND AIR BAG SYSTEM

(75) Inventors: Masayuki Yamazaki; Katsuhito Miyaji, both of Himeji (JP)

(73) Assignee: Daicel Chemical Industries, Ltd., Osaka (JP)

(*) Notice: Subject to any disclaimer, the term of this patent is extended or adjusted under 35 U.S.C. 154(b) by 0 days.

(21) Appl. No.: 09/339,225

(22) Filed: Jun. 24, 1999

(30) Foreign Application Priority Data

Jun. 26, 1998 (JP) .................................. 10-179960

(51) Int. Cl.[7] .............................................. B60R 21/26
(52) U.S. Cl. ................... 280/741; 280/728.1; 280/736; 280/743.1
(58) Field of Search .......................... 280/741, 728.1, 280/736, 743.1

(56) References Cited

U.S. PATENT DOCUMENTS

| | | | | |
|---|---|---|---|---|
| 5,178,409 A | * | 1/1993 | Hiramitsu et al. | 280/731 |
| 5,253,895 A | * | 10/1993 | Bretfeld et al. | 280/736 |
| 5,503,806 A | * | 4/1996 | Fulmer et al. | 422/164 |
| 5,564,743 A | * | 10/1996 | Marchant | 280/741 |
| 5,566,972 A | * | 10/1996 | Yoshida et al. | 280/728.2 |
| 5,613,705 A | * | 3/1997 | Hock et al. | 280/741 |
| 5,756,928 A | * | 5/1998 | Ito et al. | |
| 5,782,487 A | * | 7/1998 | Bauer et al. | 280/741 |
| 5,931,491 A | * | 8/1999 | Bosgeiter et al. | 280/728.2 |
| 5,934,705 A | * | 8/1999 | Siddiqui et al. | 280/736 |
| 5,938,236 A | * | 8/1999 | Tanaka et al. | 280/741 |
| 6,032,979 A | * | 3/2000 | Mossi | 280/741 |
| 6,079,740 A | * | 6/2000 | Barth et al. | 280/737 |
| 6,089,597 A | * | 7/2000 | Leifheit et al. | 280/737 |
| 6,116,643 A | * | 9/2000 | Katsuda et al. | 280/741 |
| 6,129,381 A | * | 10/2000 | Katsuda et al. | 280/741 |
| 6,135,496 A | * | 10/2000 | Katsuda et al. | 280/736 |
| 6,139,055 A | * | 10/2000 | Dahl et al. | 280/741 |
| 6,142,515 A | * | 11/2000 | Mika | 280/736 |
| 6,183,006 B1 | * | 2/2001 | Katsuda et al. | 280/736 |

FOREIGN PATENT DOCUMENTS

WO        9610495 A1        4/1996

* cited by examiner

*Primary Examiner*—Brian L. Johnson
*Assistant Examiner*—Deanna Draper

(57) ABSTRACT

A gas generator for an air bag, in which conduction of heat generated by combustion of a gas generating agent is restricted to effectively reduce or inhibit a temperature increase of a diffuser side on an outer shell container, is provided and thus, reduces the maximum surface temperature of the diffuser. The gas generator includes a housing which has a diffuser shell with at least one gas discharge port and a closure shell for forming an accommodating space together with the diffuser shell and the gas generating agent, installed in the housing, ignited and burnt by an igniting unit to generate a combustion gas, wherein the gas generator further includes a heat transfer restricting member for making a conduction of heat generated by a combustion of the gas generating agent to the diffuser shell side smaller than that to the closure shell side.

9 Claims, 5 Drawing Sheets

GAS GENERATOR FOR AN AIR BAG AND AIR BAG SYSTEM

BACKGROUND OF THE INVENTION

1. Field of the Invention

The present invention relates to a gas generator for an air bag, and to an air bag system.

2. Description of the Related Art

An air bag system mounted on various vehicles such as automobiles has an object that, when the vehicle collides at a high speed, an air bag (bag body), which is rapidly inflated by gas, supports a vehicle occupant so as to prevent the occupant from being injured in colliding with hard portions of a vehicle interior such as a steering wheel and a windshield glass due to inertia of the occupant.

In general, such an air bag system comprises a gas generator which is operated by a collision of a vehicle to discharge gas, and an air bag to which the discharged gas is introduced to be inflated. Conventionally, as such a gas generator, there has been provided a gas generator having a structure that gas generating means is, burnt to generate combustion gas, is accommodated in the gas generator, and gas generated by the combustion of the gas generating means is discharged from the gas generator.

In the gas generator for an air bag which generates combustion gas by a combustion of the gas generating means, an operating time of the gas generator is an extremely short, that is, about 60 milliseconds. However, since a combustion gas generated by the combustion of the gas generating means has high temperature, the following case is considered after the gas generator has been operated; more specifically, a temperature of an outer container (housing) of the gas generator gradually increases due to conduction of heat generated by combustion of the gas generating means. In particular, in the case of a gas generator including coolant means in its outer container so that high temperature gas is not directly introduced into an air bag, the coolant means cools combustion gas and combustion residues by heat exchange. For this reason, the coolant means itself becomes hot, and then, heat of the coolant means is transferred to the outer container; as a result, the temperature of the outer container increases. The aforesaid gas generator is installed in a module case together with an air bag, and is mounted on various vehicles as an air bag system. In this case, considering safety after the gas generator has been operated, in the gas generator, it is desirable to prevent a temperature increase on a side where the air bag is inflated, that is, on the diffuser shell side, as much as possible. This is because the following problem is considered. An air bag quickly deflates after inflating due to a collision. When an occupant accidentally touches the diffuser shell, in the case where the surface temperature on the diffuser shell side is too high, the occupant may burn himself due to the increased temperature of the diffuser shell side.

However, there has not been provided a gas generator for an air bag, which effectively reduces or inhibits a temperature increase in an outer shell container on a diffuser side after the gas generator has been operated (in particular, a temperature increase by conduction of heat generated by combustion of the gas generating means).

Incidentally, in the past, International Publication No. WO96/10495 discloses a gas generator having a structure in which a heat insulating member is provided above and/or below an outer chamber including a gas generating agent. In the aforesaid gas generator, the heat insulating member is disposed between the gas generating agent and the container (housing) in order not to affect a burning velocity of the gas generating agent by ambient temperature. In this case, the gas generator has an effect of preventing a temperature increase of a housing, where the heat insulating member is provided, after the gas generator is operated. However, the surface temperature under the heat insulating member is substantially high, and the heat insulating member peels from the outer container by gas jetting at a high speed. As a result, there is the case where no achievement of the purpose is made.

SUMMARY OF THE INVENTION

In view of the above problem in the prior art, it is therefore an object of the present invention to provide a gas generator for an air bag, which can restrict conduction of heat generated by combustion of gas generating means after the generator is operated to effectively reduce or inhibit a temperature increase of a diffuser side in an outer shell container, and thus, can reduce the maximum surface temperature of the diffuser.

According to the present invention, the diffuser is prevented from becoming too hot and the air bag can be used with safety.

To achieve the above object, the present invention provides a gas generator for an air bag comprising a housing which has a diffuser shell with at least one gas discharge port and a closure shell for forming an accommodating space together with the diffuser shell, and gas generating means, installed in the housing, to be ignited and burnt by igniting means and to generate a combustion gas, wherein the gas generator further includes heat transfer restricting means for making a conduction of heat generated by combustion of the gas generating means to the diffuser shell side less than that to the closure shell side. In the case that the coolant means for cooling the combustion gas generated by the combustion of the gas generating means is accommodated in the housing, it is desirable that the heat transfer restricting means reduces or inhibits heat conduction from the coolant means to the diffuser shell. In general, the coolant means is used so as not to directly introduce the combustion gas generated by the combustion of the gas generating means into the air bag. The conduction of heat generated by combustion of the gas generating means to the diffuser shell after the gas generator has been operated is mainly made from the coolant means. For this reason, the heat transfer restricting means is disposed between the coolant means and the diffuser shell, and thereby, it is possible to effectively reduce or inhibit heat conduction from the coolant means.

The gas generator of the present invention includes the heat transfer restricting means, and thereby, it is possible to make the maximum surface temperature of the diffuser shell (i.e., the highest temperature of a surface temperature range of the diffuser shell after the gas generating agent has been burnt) lower than that of the closure shell. The aforesaid heat transfer restricting means includes, for instance, a heat transfer suppressing member disposed between the diffuse shell and a member such as the coolant means for conducting a heat generated by the combustion of the gas generating means to the diffuser shell, or a space formed between both components. The heat transfer suppressing member reduces or inhibits conduction of heat generated by combustion of the gas generating means from the coolant means and the like to the diffuser shell, and must function so that at least heat generated by combustion of the gas generating means is not conducted to the diffuser shell. The aforesaid heat transfer suppressing member includes, for instance, a heat insulating member formed by using a proper heat insulating material, a space forming member for forming a heat insulating space or the like. Desirably, the heat insulating member is sufficiently durable to a combustion temperature of the gas generating means and exhibits a heat insulating effect. Preferably, a ceramic or ceramic fiber is used as the heat insulating member, in particular. Moreover, a space formed by the space forming member disposed between the coolant means and the diffuser shell serves to reduce or inhibit a heat conduction from the coolant means to the diffuser shell. Therefore, preferably, the space is a heat insulating space at least capable of reducing or inhibiting a heat conduction between the coolant means and the diffuser shell. In particular, the space forming member preferably has a structure where the heat insulating space can be formed. In addition, in the case of using the space formed between the coolant means and the diffuser shell as the heat transfer restricting means, the coolant means and the diffuser shell do not directly make contact with each other, and no member of conducting heat is disposed between both components. Thus, a heat of the coolant means is not directly conducted to the diffuser shell, and is conducted thereto by only its radiation and/or convection. As a result, it is possible to restrict an increase of the surface temperature of the diffuser shell.

As described above, the heat transfer suppressing member is disposed between the diffuser shell and a member such as the coolant means which absorbs heat generated by combustion of the gas generating agent. In the case of interposing the heat transfer suppressing member between the coolant means and an inner surface of a ceiling portion of the diffuser shell, in order to prevent a short-pass, in which a combustion gas passes between the heat transfer suppressing member and the coolant means, and/or between the heat transfer suppressing member and the diffuser shell, a short-pass preventing member, which covers an area ranging from the upper inner surface of the coolant means to an inner surface of the ceiling portion of the diffuser shell, may be formed integrally with the heat transfer suppressing member. For example, in the case of using a heat insulating member as the heat transfer suppressing member, the heat insulating member and the short-pass preventing member may be integrally formed. Also, in the case of using a space forming member as the heat transfer restricting means, for example, the space forming member and the short-pass preventing member may be integrally formed as shown in an Embodiment 1 of FIG. 1 which will be described later.

In addition to the coolant means in the conventional case which comprises a metallic wire mesh for cooling combustion gas generated by combustion of the gas generating means, the coolant means may also include the filter means as described above which is generally used for removing residues in combustion gas and also performs a cooling function of the combustion gas. Moreover, a coolant/filter, which has a complicated spacing structure with the use of a multi-layer wire mesh body so as to cool combustion gas and collects combustion residues in the combustion gas, may also be used. In general, each of these coolant means is formed into a substantially cylindrical shape, and is arranged outside a portion where the gas generating means is positioned. An outer periphery of the coolant means may be provided with an outer layer which comprises a multi-layer wire mesh body, a multi-perforated cylinder, an annular belt or the like in order to prevent the coolant means from being bulged by the combustion of the gas generating means.

In the gas generator of the present invention, a conventional azide based gas generating material(s) on the basis of inorganic azide, for example, natrium azide (sodium azide) can be used as the gas generating means which is contained in the housing and is burnt to generate a combustion gas, and besides, a non-azide based gas generating material(s), which is not based on the inorganic azide can also be used. However, in general, the non-azide based gas generating material is higher in combustion temperature than the azide based gas generating material, and the former has a higher calorific value permit gas generating quantity than the latter. Further, in the gas generator of the present invention, since the heat transfer restricting means can make the maximum surface temperature of the diffuser shell lower than that of the closure shell, a further remarkable effect can be obtained by using the non-azide based gas generating material as the gas generating means. Various materials have been proposed as the non-azide based gas generating compositions. For example, the following materials are known as the agent; more specifically, an organic compound containing nitrogen, such as tetrazole, triazole, or metal salts of these, etc., and an oxidizing agent containing oxygen, such as alkali metal nitrate, etc., and compositions using as their fuel and nitrogen source, triaminoguanidine nitrate, carbohydrazide, nitroguanizine, etc., and using as their oxidizing agent the nitrate, chlorate, perchlorate, etc., of an alkali metal or alkali earth metal. These non-azide based gas generating materials are applicable to the present invention; however, the gas generating agent of the present invention is properly selected on demand of a burning velocity, non-toxicity and combustion temperature, without being limited to these. The gas generating agent is used in a proper shape such as a pellet, a wafer, a hollow cylinder, a disk, a single or multiple perforated body, etc.

The housing is formed by casting, forging or pressing the diffuser shell having the gas discharge port and the closure shell for forming an accommodating space together with the diffuser shell, and by joining both shells together. Joining of both shells is carried out by various welding methods, for example, electron beam welding, laser welding, TIG arc welding, projection welding or the like. In the case where the diffuser shell and the closure shell are formed by pressing various steel plate and sheet such as stainless copper plate, it is possible to readily manufacture both shells, and to achieve a reduction in its manufacture cost. Moreover, these shells are formed into a cylinder, that is, a simple shape, and thereby, its pressing is easy. Preferably, a stainless steel plate is used as the material of the diffuser shell and the closure shell, and a copper plate with nickel plating may be used. Incidentally, an interior space of the housing is divided into two chambers by providing the inner cylindrical member inside the housing, and thereafter, various members may be properly contained therein.

Further, the housing is usually provided therein with igniting means which is operated when an impact is detected, and ignites and burns the gas generating means. The igniting means may be either of a mechanical ignition type igniting means which is operated upon sensing an impact exclusively by means of a mechanical device or mechanism, and an electric ignition type igniting means which is operated by an electrical signal transmitted from an impact sensor for sensing an impact. Preferably, the electric ignition type igniting means is used as the igniting means. The electric ignition type igniting means comprises: an electrical sensor which senses an impact exclusively by an electrical mechanism; an igniter which is operated by an electrical signal transmitted from the sensor upon sensing an impact; and a transfer charge ignited by the operation of the igniter and then burns. As the electrical sensor, there is, for example, a semiconductor type acceleration sensor or the like.

The aforesaid gas generator for an air bag is accommodated in a module case together with an air bag (bag body) to which gas generated by the gas generator is introduced to expand the bag, and thus, an air bag system is constructed. In the air bag system, the gas generator is operated at the point of time when the impact sensor senses an impact, and combustion gas is discharged from the gas discharge port of the housing. Then, the combustion gas flows into the air bag, and thereby, the air bag breaks the module cover and inflates, and thus, forms a cushion for absorbing an impact between hard structures in a vehicle and a vehicle occupant.

Further, to achieve the above object, the present invention provides a method for reducing temperature increase of a diffuser shell in a gas generator for an air bag comprising a housing which has a diffuser shell with at least one gas discharge port and a closure shell for forming an accommodating space together with the diffuser shell and gas generating means, installed in the housing, to be ignited and burnt by igniting means and to generate a combustion gas, wherein a conduction of heat generated by combustion of the gas generating means to the diffuser shell is reduced or inhibited to reduce a temperature increase of an outer surface of the diffuser shell by combustion of the gas generating means.

The conduction of combustion gas of the gas generating means to the diffuser shell is reduced or inhibited by interposing a space forming member and a heat transfer suppressing member such as a heat insulating member between the diffuser shell and a coolant means. The coolant means may be a coolant/filter which is formed to have a complicated spacing structure with the use of the multi-layer wire mesh body.

The present invention provides a gas generator for an air bag, which can effectively reduce or inhibit a temperature increase on a diffuser side by heat generated by combustion of gas generating means after the gas generator has been operated, and thus, can reduce the maximum surface temperature of the diffuser.

DETAILED DESCRIPTION OF THE PREFERRED EMBODIMENTS

A gas generator for an air bag of the present invention will be described below with reference to preferred embodiments shown in the accompanying drawings.

EMBODIMENT 1

Figure 1:
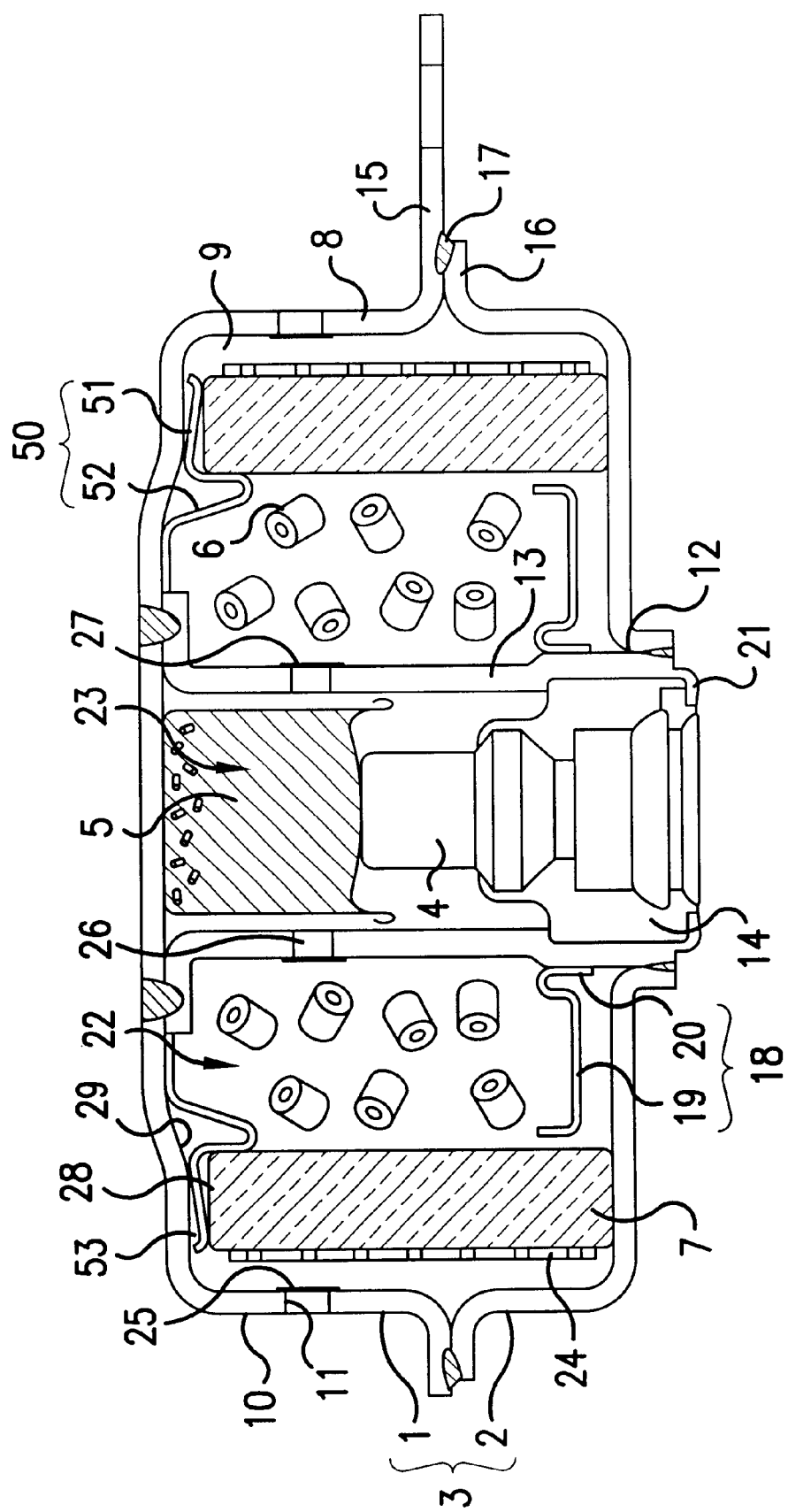
FIG. 1 is a longitudinal sectional view showing a preferred embodiment of a gas generator for an air bag of the present invention.

FIG. 1 is a longitudinal sectional view showing a first embodiment of a gas generator for an air bag of the present invention.

As shown in FIG. 1, a gas generator includes a housing 3 comprising a diffuser shell 1 and a closure shell 2. An interior of the housing 3 is divided by an inner cylindrical member 13 into two chambers, that is, an igniting means accommodating chamber 23 and a gas generating agent combustion chamber 22. The igniting means accommodating chamber 23 is provided, therein, with an igniter 4 and a transfer charge 5, as igniting means, which ignites and burns the gas generating agent 6 upon its activation when an impact is detected. On the other hand, the combustion chamber 22 is provided therein with gas generating agent 6 which is ignited and burnt by the igniting means to generate a combustion gas, and a substantially disk-like under plate 18 which supports the gas generating agents 6 and prohibits a movement of these agents. A circumferential wall portion 10 of the diffuser shell 1 is formed with a plurality of gas discharge ports 11 in equal intervals in a circumferential direction thereof, and each gas discharge port 11 is closed by a seal tape 25. In the closure shell 2, an inner cylindrical member 13 is arranged such that it is fitted into a central opening 12 of the closure shell 2. The diffuser shell 1 and the closure shell 2 are jointed together by laser welding in a state of mutually overlapping their flange portions 15 and 16 in the vicinity of the middle position in cross section in an axial direction of the housing 3, and thus, form the housing 3.

Moreover, in order to purify and cool gas generated by ignition and combustion of the gas generating agent 6, a coolant/filter 7 is disposed in the housing 3. The coolant/filter 7 surrounds the gas generating agents 6 such that an annular chamber, that is, the gas generating agent combustion chamber 22 is defined between the inner cylindrical member 13 and the coolant/filter 7. Further, the coolant/filter 7 is formed by overlapping a plain stitched wire mesh made of stainless steel in a radial direction, and compressing the wire mesh in radial and axial directions. As shown in FIG. 1, a space forming member 50 is arranged at an end face 28 of the coolant/filter 7 on the diffuser shell 1 side, and thus, the coolant/filter 7 is formed shorter in the axial direction thereof than the height of the housing 3. On an outer side of the coolant/filter 7, an outer layer 24 is formed to function as suppressing means for suppressing an expansion of the coolant/filter 7. In the case of forming the coolant/filter 7 shorter in the axial direction, it is desirable that the outer layer 24 is also formed shorter in the axial direction likewise the coolant/filter 7. A gap 9 is formed between an outer peripheral wall 8 of the housing 3 and the coolant/filter 7 to function as a gas passage.

Figure 2:
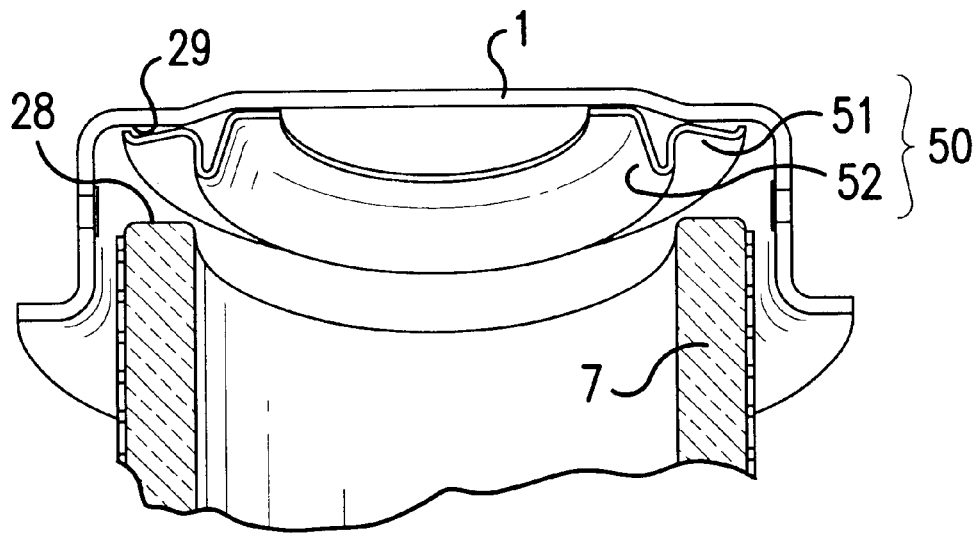
FIG. 2 is a cross-sectional view of main parts showing another embodiment of a space forming member in shown in FIG. 1.
Figure 3:
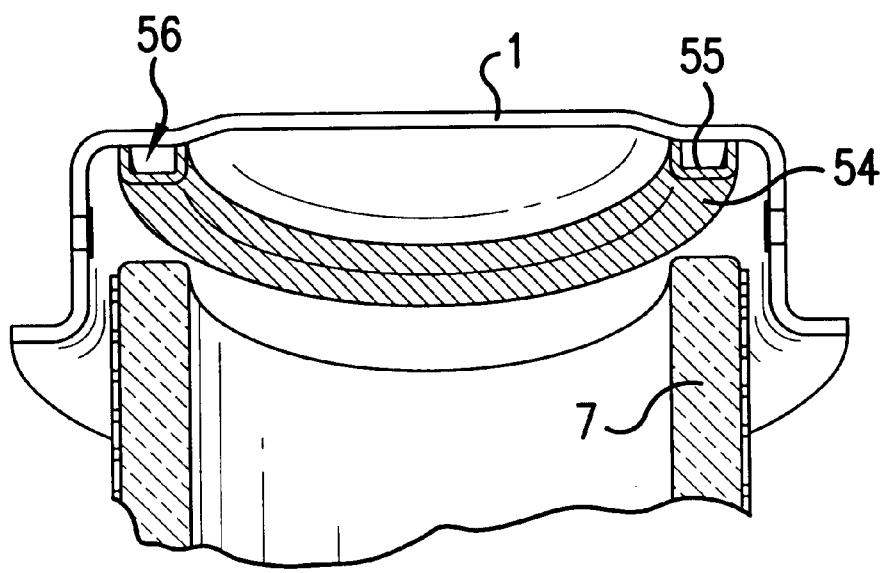
FIG. 3 is a cross-sectional view of main parts showing another embodiment of a heat transfer restricting means.

The space forming member 50 is disposed between the coolant/filter 7 and an upper inside 29 of the diffuser shell 1 as a heat transfer restricting means for making conduction of heat generated by a combustion of the gas generating agent to the diffuser shell side less than that to the closure shell side. The space forming member 50 comprises a space forming portion 51 which is formed in a manner that an outer periphery of a ring-like member is curved in a plain direction, and a short-pass preventing portion 52 which covers an inner peripheral surface of the upper portion (i.e., diffuser shell side) of the coolant/filter 7. The space forming portion 51 is held between the coolant/filter 7 and the diffuser shell 1, and thereby, a space 53 is formed between these members. The space 53 functions as a heat insulating space for inhibiting a heat conduction from the coolant/filter 7 to the diffuser shell 1. Moreover, the short-pass preventing portion 52 continuously covers an area ranging from the inner peripheral surface of the coolant/filter 7 to an upper inside 29 of the diffuser shell 1, and thereby, it is possible to prevent a short-pass, that is, prevents a combustion gas from passing through a portion abutting the coolant/filter 7 against the space forming portion 51 and through a portion abutting the upper inside 29 of the diffuser shell 1 against the space forming portion 52. FIG. 2 is an enlarged cross-sectional view showing main parts of the space forming member 50. As shown in FIG. 2, the space forming portion 51 of the space forming member 50 is held between the upper inside 29 of the diffuser shell 1 and the end face 28 on the diffuser shell side of the coolant/filter 7; on the other hand, the short-pass preventing portion 52 is fitted into an inner periphery of the coolant/filter 7. Also, in place of the space forming member 50, a space forming member 54, as shown in FIG. 3, may be used. The space forming member 54 is formed into a substantially recessed shape in its longitudinal cross section, and by a recessed portion 55 of the space forming member 54, a space 56 is formed between the coolant/filter 7 and the diffuser shell 1. The space 56 shown in FIG. 3 also reduces or inhibits heat conduction from the coolant/filter 7 to the diffuser shell 1; therefore, after the gas generating agent is burnt, the maximum surface temperature of the diffuser shell 1 becomes lower than the maximum surface temperature of the closure shell 2.

An inner periphery of the coolant/filter 7 may be provided with a substantially cylinder-like perforated basket (not shown) which protects the coolant/filter 7 from a flame generated by the combustion of the gas generating agent 6, and prevents the gas generating agent and the coolant/filter 7 from directly contacting with each other.

In the housing 3, the substantially disk-like under plate 18 is arranged in the combustion chamber 22 defined outside the inner cylindrical member 13. Further, the under plate 18 has a circular portion 19 which comes in contact with the gas generating agent 6, and a central opening 20 for fitting an outer peripheral wall of the inner cylindrical member 13 thereto. The circular portion 19 supports the gas generating agents 6 to inhibit movement of the gas generating agents 6, and thereby, there is no possibility that the gas generating agent 6 breaks due to vibration, varying surface area of the gas generating agent 6. A crimping portion 21 is formed at an end portion on a side including the igniter 4 of the inner cylindrical member 13 to fix the igniter 4. Moreover, a peripheral wall of the inner cylindrical member 13 is formed with a plurality of flame transferring ports 26 at equal intervals. Each flame transferring port 26 is closed by a seal tape 27. In this embodiment, the aforesaid outer layer 24, the gap 9 and the perforated basket is provided as the need arises, and may be omitted.

In the gas generator shown in FIG. 1, when the transfer charge 5 is ignited and burnt by the igniter 4 operated upon impact, the flame breaks the seal tape 27 that closes the flame transferring ports 26 of the inner cylindrical member 13, and then, flows into the combustion chamber 22. Whereupon, the gas generating agent 6 in the combustion chamber 22 is ignited and burnt by the flame of the transfer charge 5, and then, generates a combustion gas. The combustion gas is purified and cooled while passing through the coolant/filter 7, and then, passes through the gap 9. Further, the combustion gas breaks the seal tape 25 closing the gas discharge port 11, and then, is discharged from the gas discharge port 11. On the other hand, the coolant/filter 7 cools the combustion gas and combustion residues by heat exchange; for this reason, the temperature of the coolant/filter increases. However, the heat of the coolant/filter 7 is not conducted to the diffuser shell 1 because a space 53 is formed by the space forming member 50 between the diffuser shell 1 and the coolant/filter 7. Therefore, it is possible to make the maximum surface temperature of the diffuser shell 1, after the gas generating agent 6 is burnt, lower than that of the closure shell 2.

The heat transfer restricting means explained based on that the space forming member makes a heat conduction on the diffuser shell side generated by the combustion of gas generating agent less than that on the closure shell side. In addition to the space forming members as shown in FIG. 1 to FIG. 3, the aforesaid heat transfer restricting means includes another embodiments as shown in FIG. 4 and FIG. 5. The heat transfer restricting means according to these embodiments will be described below with reference to the drawings.

Figure 4A:
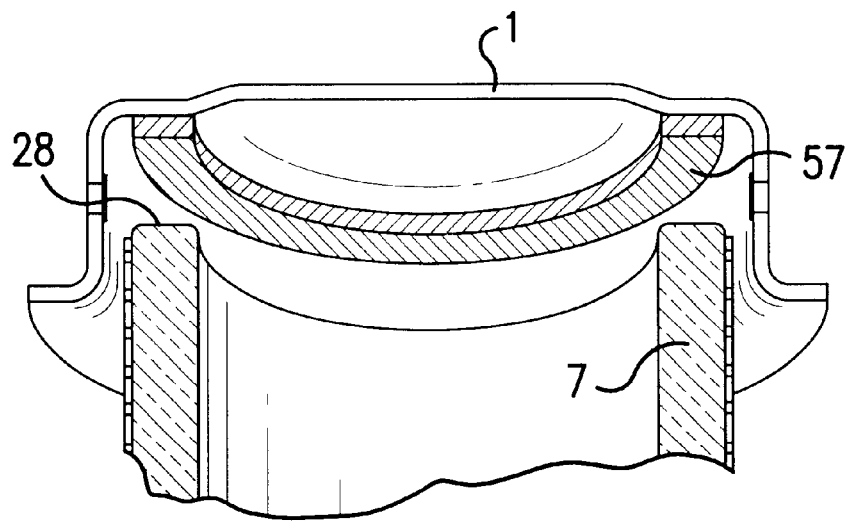
FIG. 4 is a cross-sectional view of main parts showing still another embodiment of the heat transfer restricting means.
Figure 4B:
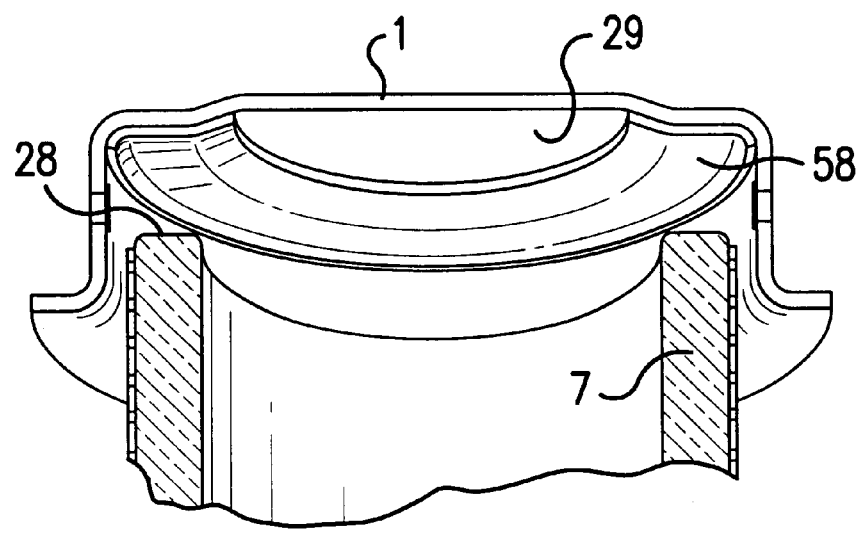
Figure 5:
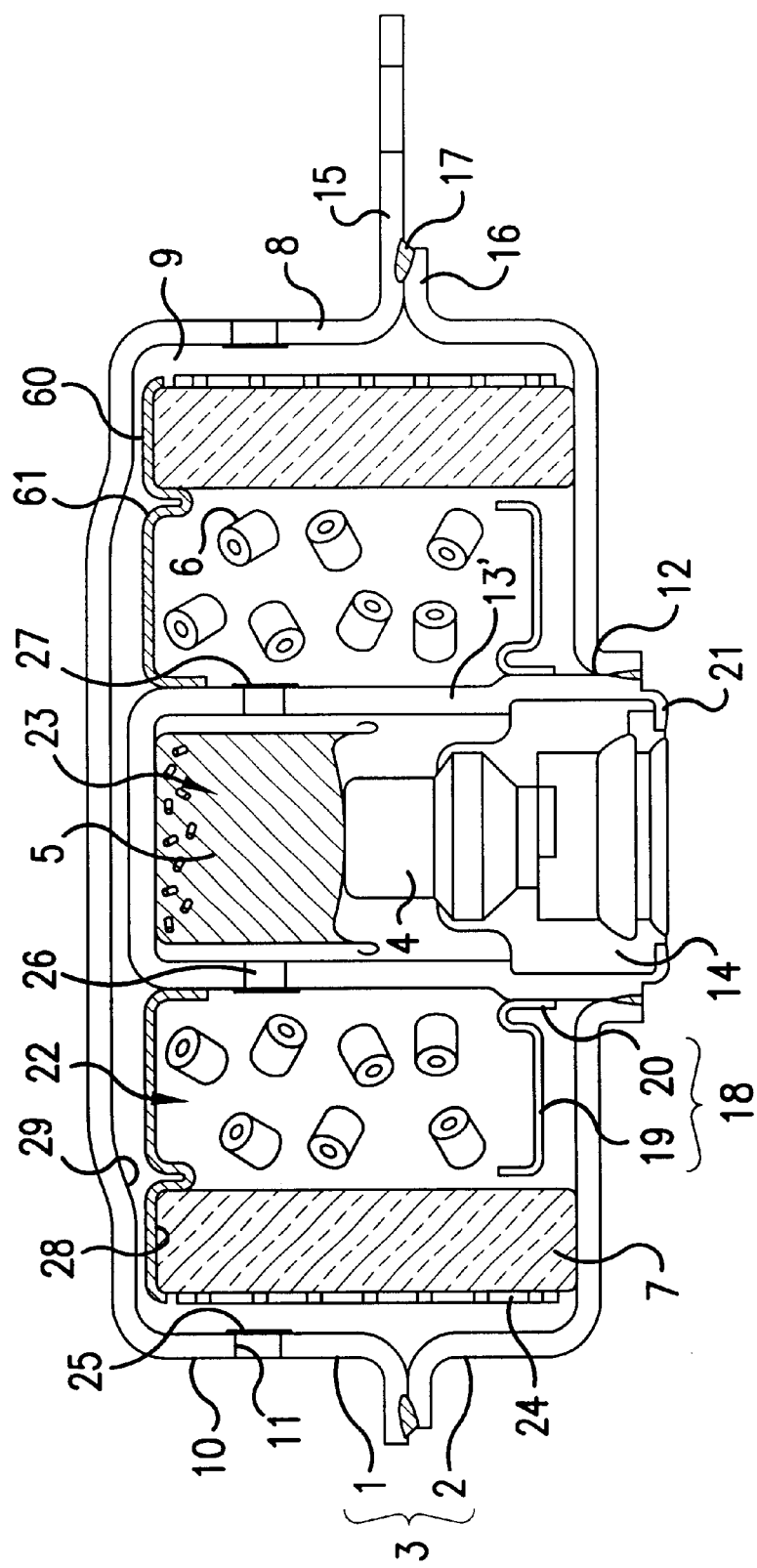
FIG. 5 is a cross-sectional view of main parts showing still another embodiment of the heat transfer restricting means.

Each heat transfer restricting means as shown in FIG. 4a and FIG. 4b is a heat insulating member for inhibiting heat conduction from the coolant/filter 7 to the diffuser shell 1, and is disposed between the coolant/filter 7 and the diffuser shell 1. Thus, the heat of the coolant/filter 7, which is increased when cooling a combustion gas of the gas generating agent is not conducted to the diffuser shell 1. As a result, the temperature increase of the diffuser shell 1 is prevented, and therefore, it is possible to make the maximum surface temperature of the diffuser shell lower than that of the closure shell. A heat insulating member 57 shown in FIG. 4a is formed into a ring shape having a size corresponding to the end face 28 of the coolant/filter 7. On the other hand, a heat insulating member 58 shown in FIG. 4b is formed like a ring shape having a size larger than the end face 28 of the coolant/filter 7, and has a shape corresponding to a concave and convex shape of the upper inner side 29 of the diffuser shell 1. These heat insulating members 57 and 58 comprise a ceramic or ceramic fiber; more specifically, a material which is sufficiently durable to a combustion temperature of the gas generating agent and exhibits a heat insulating effect.

A heat transfer restricting means of another embodiment shown in FIG. 5 is a space 60 formed between the coolant/filter 7 and the diffuser shell 1. The space 60 is formed such that a heat of the coolant/filter 7 is not directly conducted to the diffuser shell 1. As a result, in the gas generator having the aforesaid space 60, the heat of the coolant/filter 7 is not conducted to the diffuser shell 1 except by radiation. Therefore, the heat of the coolant/filter 7 is preferentially conducted to the closure shell 2.

Moreover, the gas generator shown in FIG. 5 is different from the gas generator shown in FIG. 1 in that an inner cylindrical member 13' does not directly make contact with the diffuser shell 1. Thus, the short-pass preventing means 61, which supports the coolant/filter 7, comes in contact with the inner cylindrical member 13'; for this reason, the heat of the coolant/filter 7 is conducted to the short-pass preventing means 61 and the inner cylindrical member 13', but is not directly conducted to the diffuser shell 1. Also, a diffuser shell side of the inner cylindrical member 13' is closed such that a flame from the transfer charge 5 is not directly discharged to the diffuser shell 1 side. The short-pass preventing means 61 has a disk shape covering a portion where the gas generating agent 6 is accommodated and the end face of the coolant/filter 7, and further, is formed into a curved shape to abut against an upper inner peripheral surface of the coolant/filter 7.

Like reference numerals are used to designate other members same as FIG. 1, and an explanation of these members is omitted.

EMBODIMENT 2

Figure 6:
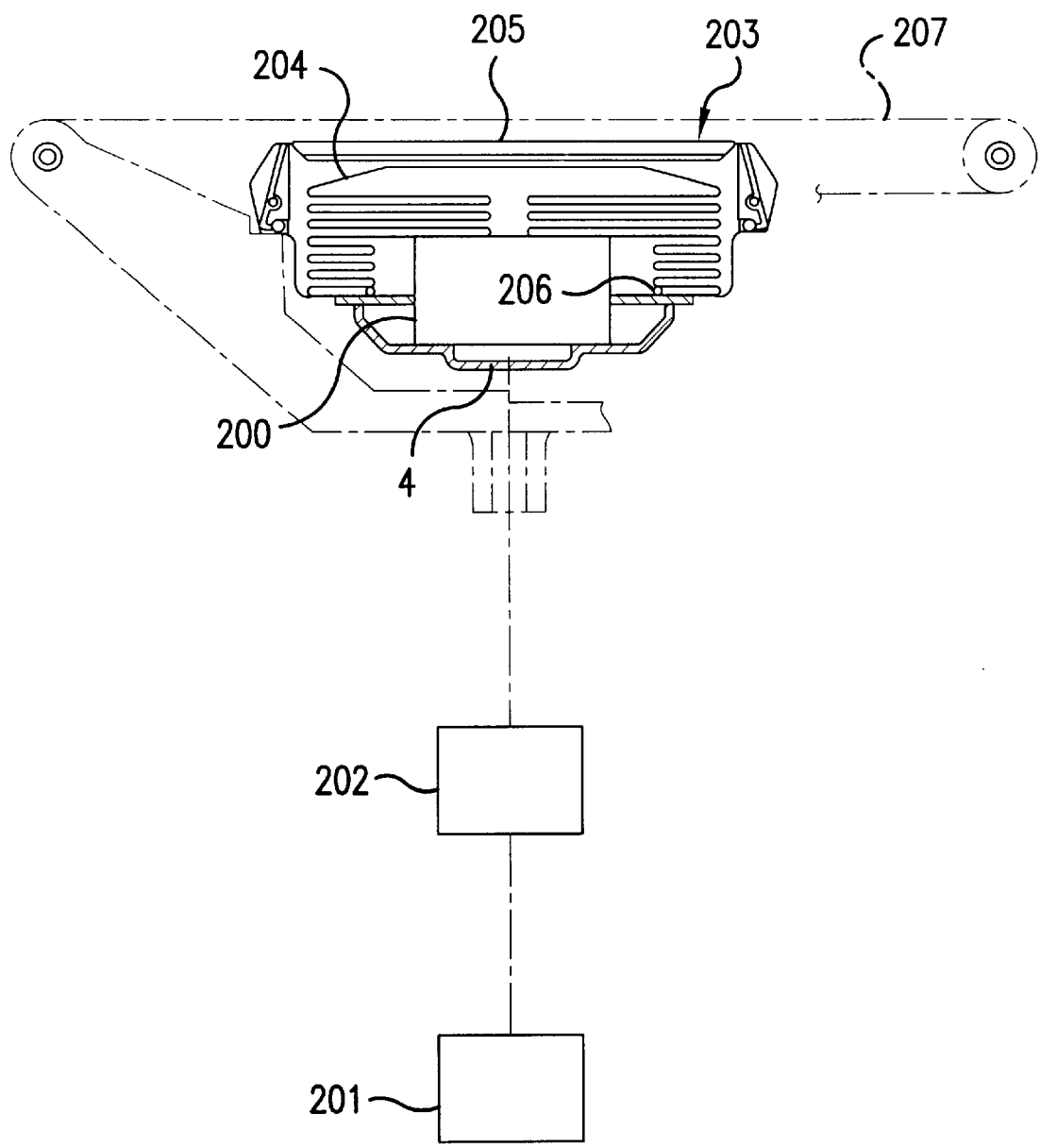
FIG. 6 is a view showing a configuration of an air bag system of the present invention.

FIG. 6 is a view showing a configuration of an air bag system of the present invention including a gas generator using an electric ignition type igniting means.

The air bag system comprises a gas generator 200, an impact sensor 201, a control unit 202, a module case 203, and an air bag 204. The gas generator described based on FIG. 1 is used as the gas generator 200. An operating performance of the gas generator 200 is adjusted so that an impact given to a vehicle occupant is as little as possible in the initial stage when the gas generator is operated.

The impact sensor 201 comprises a semiconductor type acceleration sensor, for example. The semiconductor type acceleration sensor has four semiconductor strain gages formed on a silicon substrate beam which is deflected when acceleration occurs. These semiconductor strain gages are bridge-connected. When acceleration occurs, the beam is deflected, and then, the surface becomes strained. A resistance of the semiconductor strain gage changes by the strain, and this change in resistance is detected as a voltage signal which is proportional to the acceleration.

The control unit 202 includes an ignition discriminator circuit, and a signal from the semiconductor type acceleration sensor is inputted to the ignition discriminator circuit. At the point of time when an impact signal from the impact sensor 201 exceeds a predetermined value, the control unit 202 starts a computation. When a computation result exceeds a predetermined value, the control unit 202 outputs an operating signal to the igniter 4.

The module case 203 is made of polyurethane, for example, and includes a module cover 205. The air bag 204 and the gas generator 200 are installed inside the module case 203 so as to constitute a pad module. In general, the pad module is attached to a steering wheel 207 in the case of being mounting to a driver's seat side of an automobile.

The air bag 204 is made of nylon (e.g., nylon 66) or polyester, and is fixed to a flange portion of the gas generator in a state that an air bag opening 206 encloses the gas discharge ports of the gas generator while being folded.

When the semiconductor type acceleration sensor 201 senses an impact at the time of an automobile collision, an impact signal is transmitted to the control unit 202, and then, the control unit 202 starts a computation at the point of time when the impact signal from the sensor exceeds a certain value. Then, the control unit 202 outputs an operating signal to the igniter 4 of the gas generator 200 when the computation result exceeds a certain value. In this manner, the igniter 4 is operated to ignite the gas generating agent, and the gas generating agent burns and generates gas. The gas is ejected into the air bag 204, and thereby, the air bag 204 breaks the module cover 205 and inflates to form a cushion for absorbing an impact between the steering wheel 207 and the occupant.

EXPERIMENTAL EXAMPLES

With the use of the gas generator including the heat transfer restricting means under conditions shown in the following experimental examples, the maximum surface temperature of diffuser shell when the gas generating agents are burnt was measured, and then, was compared with the maximum surface temperature of the diffuser shell when the gas generating agents of the gas generator having no heat transfer restricting means are burnt. The comparative results are shown in the following Table 1.

This maximum surface temperature measurement was made in a manner of pressing a K thermocouple (i.e., alumel-chromel thermocouple) to the surface of the gas generator container. In the case of the gas generator including no heat transfer restricting means, a portion of the diffuser shell contacting with the coolant means had the maximum temperature.

Experimental Example 1

Condition: As shown in FIG. 3, a heat insulating member made of stainless steel was disposed as the heat transfer restricting means between the end portion of the coolant/filter and the inside of the diffuser shell, a temperature of the diffuser shell when the gas generating agents are burnt was measured.

Experimental Example 2

Condition: As shown in FIG. 1, the space forming member was disposed as the heat transfer restricting means between the end portion of the coolant/filter and the inside of the diffuser shell to form a heat. insulating space therebetween, a temperature of the diffuser shell when the gas generating agents are burnt was measured.

TABLE 1

|  | None of heat transfer restricting means (° C.) | Including heat transfer restricting means (° C.) | Temperature difference (° C.) |
|---|---|---|---|
| Experimental Example 1 | 355 | 345 | 10 |
| Experimental Example 2 |  | 330 | 25 |

Experimental Results

According to the present embodiment, in the case of the gas generator including the heat transfer restricting means, the maximum surface temperature of the diffuser shell became lower as compared to the case of the gas generator including the heat transfer restricting means.

We claim:

1. A gas generator for an air bag, comprising:
   a housing including a top plate, a bottom plate, and a circumferential outer wall having gas discharge ports;
   gas generating means provided within said housing for generating a combustion gas;
   coolant means provided within said housing for cooling at least one of the combustion gas and combustion residues contained in the combustion gas by a heat exchange; and
   a contact preventing member for preventing said coolant means from directly contacting the top plate such that said contact preventing member restricts a heat conduction from said coolant means to the top plate after activation of said gas generator, an upper portion of said contact preventing member making contact with an inner surface of the top plate and a lower portion of said contact preventing member making contact with an upper end portion of said coolant means.

2. A gas generator for an air bag according to claim 1, wherein said contact preventing member restricts a heat conduction such that a maximum surface temperature of the top plate is lower than a maximum surface temperature of the bottom plate, after the activation of said gas generator.

3. A gas generator for an air bag according to claim 1, wherein said contact preventing member includes a heat insulating member having at least one of a ceramic and a ceramic fiber.

4. A gas generator for an air bag according to claim 1, wherein said coolant means is formed of a multi-layer wire mesh body.

5. A gas generator for an air bag according to claim 1, wherein said gas generating means is a non-azide gas generating material.

6. A gas generator for an air bag according to claim 1, wherein the top plate and a portion of the circumferential outer wall form a diffuser shell including the gas discharge ports.

7. A gas generator for an airbag according to claim 6, further comprising:

a second space defined by an outer periphery of said coolant means and the circumferential outer wall for restricting a direct heat conduction from said coolant means to the diffuser shell after activation of said gas generator.

8. A gas generator for an airbag according to claim 1, further comprising:

short-pass preventing means for covering an inner peripheral surface of said coolant means to prevent the combustion gas from passing through said first space and supporting said coolant means to induce a heat conduction from said coolant means to said short-pass preventing means.

9. A gas generator for an airbag according to claim 8, wherein, said contact preventing member is formed integrally with said short-pass preventing means.

* * * * *

UNITED STATES PATENT AND TRADEMARK OFFICE
CERTIFICATE OF CORRECTION

PATENT NO.    : 6,378,901 B1
DATED         : April 30, 2002
INVENTOR(S)   : Yamazaki et al.

It is certified that error appears in the above-identified patent and that said Letters Patent is hereby corrected as shown below:

<u>Column 10,</u>
Lines 35-52, Claim 1 is replaced with the following:

1.  A gas generator for an air bag, comprising:
a housing including a top plate, a bottom plate, and a circumferential outer wall having gas discharge ports;
gas generating means provided within said housing for generating a combustion gas upon combustion thereof;
coolant means provided within said housing for cooling at least one of the combustion gas and combustion residues contained in the combustion gas by a heat exchange;
a first space defined by an upper periphery of said coolant means and the top plate such that said first space restricts heat conduction from said coolant means to the top plate after activation of said gas generator;
a tubular member, provider within said housing, for storing ignition means therein to ignite said gas generating means, said tubular member being closed at one end thereof and fixed to the bottom plate such that said one end opposes an inner surface of the top plate; and
a contact preventing member provided in said first space for supporting said coolant means by contacting with the upper periphery of said coolant means, and preventing said coolant means from directly contacting said top plate, said contact preventing member including a circular portion provided with a bent portion defining a hole therein for suppoting said contact preventing member with respect to said tubular member by inserting said tubular member through said hole such that an inner circumferential surface of the bent portion engages with an outer circumferential surface of said tubular member.

Signed and Sealed this

Eighth Day of July, 2003

JAMES E. ROGAN
*Director of the United States Patent and Trademark Office*